(12) United States Patent
Jury et al.

(10) Patent No.: US 9,013,815 B2
(45) Date of Patent: *Apr. 21, 2015

(54) AUTOMATED CLUSTER SIZE MEASUREMENT

(71) Applicant: Seagate Technology LLC, Cupertino, CA (US)

(72) Inventors: Jason Charles Jury, Minneapolis, MN (US); Xiaowei Wu, Pleasanton, CA (US); Pierre Asselin, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/133,647

(22) Filed: Dec. 19, 2013

(65) Prior Publication Data
US 2014/0104718 A1    Apr. 17, 2014

Related U.S. Application Data

(63) Continuation of application No. 13/077,576, filed on Mar. 31, 2011, now Pat. No. 8,625,213.

(51) Int. Cl.
G11B 5/02    (2006.01)
G11B 20/12   (2006.01)

(52) U.S. Cl.
CPC ................... *G11B 20/1252* (2013.01)

(58) Field of Classification Search
None
See application file for complete search history.

(56) References Cited

U.S. PATENT DOCUMENTS 8,625,213 B1 *    1/2014    Jury et al. ............ 360/25
2005/0058854 A1 * 3/2005    Takekuma et al. .... 428/694 TM \* cited by examiner

*Primary Examiner* — Daniell L Negron

(57) ABSTRACT

A cluster size measurement method includes writing a first pattern of a first size of a first number of magnetic clusters. A second pattern of a second size of a second number of magnetic clusters is written, wherein the second plurality of clusters includes clusters of the first number of clusters and a switched cluster. A cluster size of the switched cluster is automatically determined by contrasting the first size and the second size.

20 Claims, 11 Drawing Sheets

AUTOMATED CLUSTER SIZE MEASUREMENT

RELATED APPLICATIONS

The present application is a continuation of U.S. patent application Ser. No. 13/077,576, filed on Mar. 31, 2011, by Jury et al., which is incorporated herein in its entirety and for all purposes.

FIELD

Embodiments according to the present invention generally relate to magnetic media.

BACKGROUND

In magnetic recording media, for example as used in hard disk drives, information is written to and read from magnetic elements that represent digital bits. The minimum size that can be written to is called a cluster, and cluster size defines media recording density. Clusters may vary in size. Bits may include a plurality of magnetic clusters, e.g. seven to fifty clusters may equal one bit.

Just as magnetic clusters are the smallest building blocks for magnetic patterns written to a medium, the physical grains are the smallest physical building blocks. In present media, grains are polycrystalline units consisting of a single chemical composition (e.g. CoCr), separated by a boundary consisting of a different composition. Clusters may contain one physical grain or a number of grains. Grains behave like conversations at a party. A few loner grains may remain by themselves, or more interesting grains may group together in larger numbers. Therefore a single grain may be a cluster, or a number of grains may group together and form a cluster. Individual grains may be visually analyzed using microscopic instruments. However, the microscopic instruments that are capable of sensing magnetic fields (for example, transition electron microscopy) have great difficulty observing magnetic clusters in recording media. Other methods such as magnetic force microscopy suffer from poor spatial resolution, and cannot directly observe magnetic clusters.

BRIEF DESCRIPTION OF THE DRAWINGS

Embodiments of the present invention are illustrated by way of example, and not by way of limitation, in the figures of the accompanying drawings.

DETAILED DESCRIPTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

For expository purposes, the term "horizontal" as used herein refers to a plane parallel to the plane or surface of a substrate, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Figure 1:
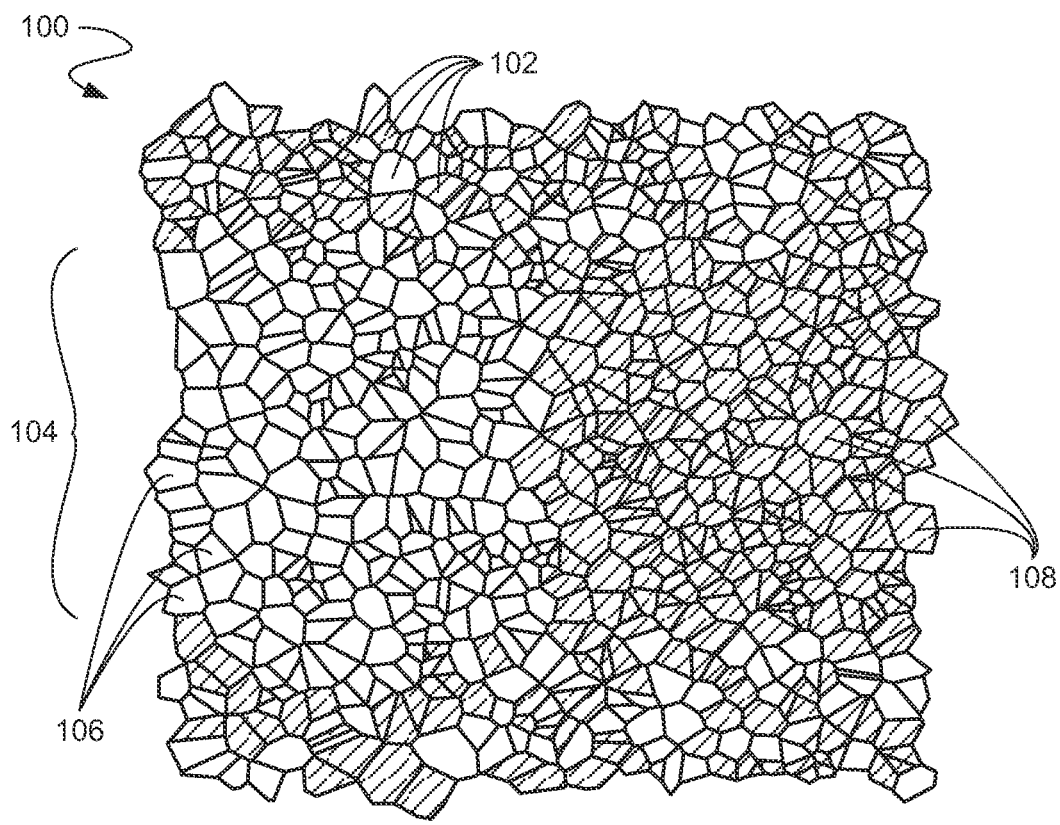
FIG. 1 is a magnified plan view of a portion of a magnetic recording media, according to an embodiment of the present invention.
Figure 1:
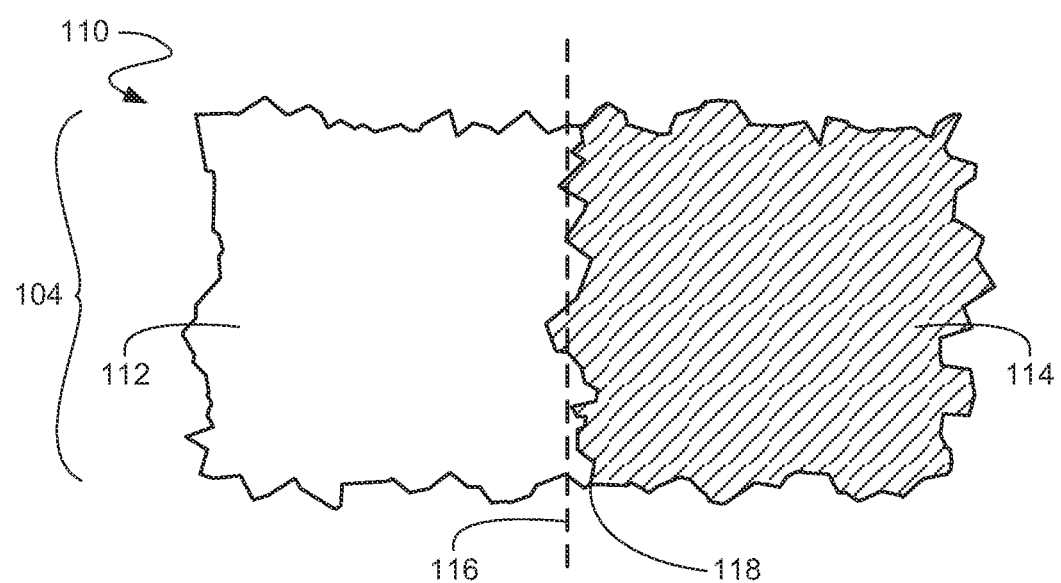

FIG. 1 is a magnified plan view of a portion of a magnetic recording media 100, according to an embodiment of the present invention. Embodiments of the present invention provide methods and systems for automatically measuring cluster size. In an embodiment, various overlapping patterns are written to a recording medium. During the writing of the patterns, a first pattern is partially overwritten by a second pattern, and each pattern is mapped after being written. The difference between the two patterns may be used to estimate individual magnetic cluster sizes that comprise the underlying medium.

The magnetic recording media 100 includes magnetic clusters 102. The magnetic clusters 102 are comprised of one or more physical grains (not shown). Physical grains may be visualized using microscopic instruments. A number of magnetic clusters 102 may form a digital bit (see FIG. 10), e.g. "0" or "1". For example, in some embodiments seven to fifty clusters may form a bit. Unlike physical grains, magnetic clusters 102 may not be seen easily using microscopic instruments.

A first pattern 104 has been written to the magnetic clusters 102. The first pattern 104 includes first clusters 106 with a first magnetic orientation, and second clusters 108 with a second magnetic orientation. After writing, the first pattern 104 is read back and mapped, creating a first media map 110. In an embodiment, a disk drive device (see FIG. 9) may be used to write and read the first pattern 104. However in some embodiments, any device capable of reading and writing to the magnetic recording media 100 may be used (e.g. spin stand or non-drive test system).

The first media map 110 is a map of the collective magnetic orientations of the magnetic clusters 102. Because individual clusters may not be seen, the first media map 110 is generated as a result of reading the first pattern 104. The first media map 110 illustrates first magnetic oriented area 112 of the first clusters 106, and second magnetic oriented area 114 of the second clusters 108.

Line 116 illustrates a boundary where, for example, a device writing to the magnetic recording media 100 stopped writing the first magnetic oriented area 112 and started writing the second magnetic oriented area 114. In some embodiments, a disk drive may have first oriented all of the magnetic clusters 102 to a first direction in a first pass. The disk drive may have then oriented a portion of the clusters beginning at the line 116 to a second direction in a second pass, thus forming the first magnetic oriented area 112 and the second magnetic oriented area 114.

The magnetic clusters 102 may not exactly align to the ideal straight line that matches line 116. In addition, physical grains do not orient in different directions within a cluster. Therefore, an individual cluster has a uniform orientation. As a result, portions of the first magnetic oriented area 112 and portions of the second magnetic oriented area 114 may extend somewhat on either side of the line 116, forming a first jagged transition line 118.

Figure 2:
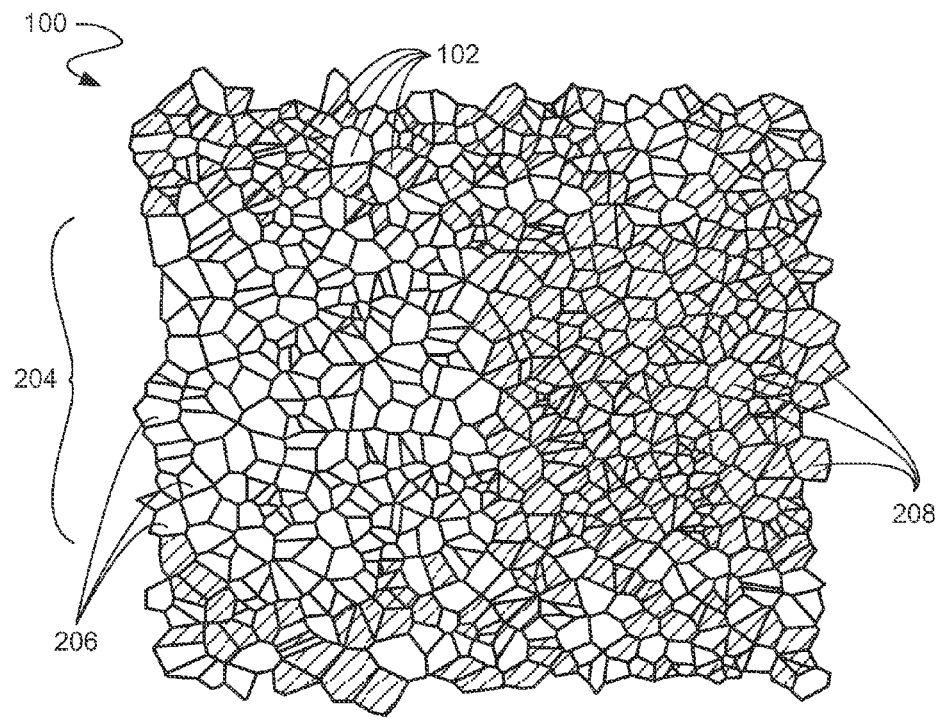
FIG. 2 is a magnified plan view of a portion of the magnetic recording media after further processing, according to an embodiment of the present invention.
Figure 2:
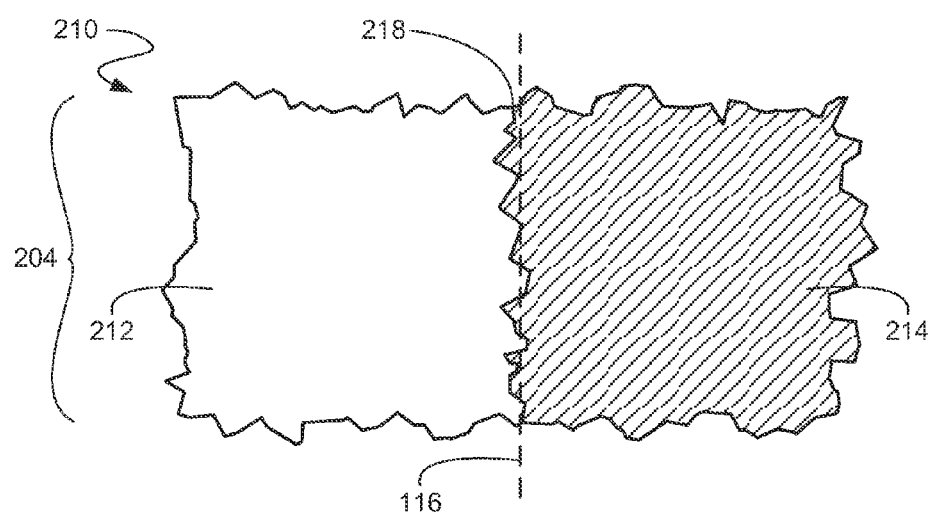

FIG. 2 is a magnified plan view of a portion of the magnetic recording media 100 after further processing, according to an embodiment of the present invention. A second pattern 204 has been written to the magnetic clusters 102. The second pattern 204 includes first clusters 206 with the first magnetic orientation, and second clusters 208 with the second magnetic orientation. After writing, the second pattern 204 is read back and mapped, creating a second media map 210. In an embodiment, the disk drive device (see FIG. 9) may be used to write and read the second pattern 204. However in some embodiments, any device capable of reading and writing to the magnetic recording media 100 may be used.

The second media map 210 is a map of the collective magnetic orientations of the magnetic clusters 102. Because individual clusters may not be seen, the second media map 210 is generated as a result of reading the second pattern 204. The second media map 210 illustrates first magnetic oriented area 212 of the first clusters 206, and second magnetic oriented area 214 of the second clusters 208.

The second media map 210 has been formed by slightly moving the line 116, e.g. by 0.5 nm. Therefore, in an embodiment, a disk drive (see FIG. 9) has changed the shape of the first magnetic oriented area 112 of the first pattern 104 (FIG. 1) and the second magnetic oriented area 114 of the first pattern 104 (FIG. 1) by writing the second pattern 204 offset from the first pattern 104 (FIG. 1), e.g. by 0.5 nm. As a result, a second jagged transition line 218 has been formed. In some embodiments, the second pattern 204 is moved in a down-track direction from the first pattern 104 (FIG. 1).

In some embodiments, the second pattern 204 may be nearly identical to the first pattern 104 (FIG. 1), and no detectable differences may exist between the first media map 110 (FIG. 1) and the second media map 210. Thus, in an embodiment, the difference between the two patterns is increased very gradually. As a result, in various embodiments, the second pattern 204 is moved a distance less than a cluster size.

Figure 3A:
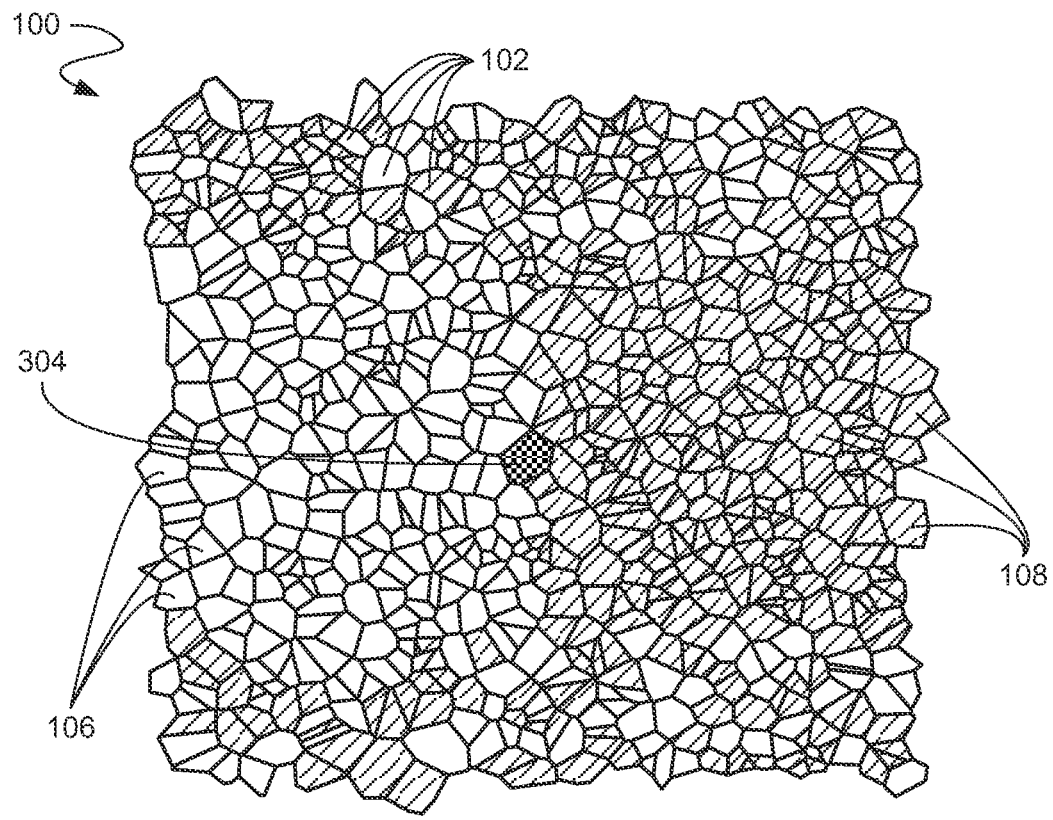
FIG. 3A is a magnified plan view of a portion of the magnetic recording media showing the change between FIG. 1 and FIG. 2, according to an embodiment of the present invention.

FIG. 3A is a magnified plan view of a portion of the magnetic recording media 100 showing the change between the first pattern 104 and the second pattern 204, according to an embodiment of the present invention. In an embodiment, the size of a transition cluster 304 is determined by contrasting the first pattern 104 and the second pattern 204. For example, a difference operation may be taken between the first pattern 104 and the second pattern 204, thus producing the size of the transition cluster 304.

Magnetic information that is recorded to the magnetic recording media 100 should conform to the granularity of the magnetic recording media 100. The granularity determines the unique form of the magnetic information. Thus, attempts to record magnetic information that have more spatial variation than the granularity can support, may result in difficulties when trying to read back from the magnetic recording media 100.

The orientation and size of the magnetic clusters 102 may be somewhat random. Thus, the granularity of the magnetic recording media 100 may be random. An equation for relating features in a two-dimensional readback map, e.g. the first magnetic oriented area 112 and the second magnetic oriented area 114, and an underlying cluster area is:

$$A_c = \frac{1}{V_0} \int \int \delta V(x', y') dx' dy'$$

wherein Ac=an area of a switched cluster, $V_0$=a zero-to-peak readback voltage, $\delta V$=a two-dimensional cluster readback map, x'=down-track coordinate (direction), y'=cross-track coordinate (direction), dx'=down-track variable of integration, and dy'=cross-track variable of integration.

In some embodiments, the zero-to-peak readback voltage $V_0$ is used to normalize the expression, e.g. to yield a meaningful "area" quantity rather than an "area-voltage" quantity. The equation above indicates that the (normalized) integral of the cluster voltage signal is proportional to the cluster area. The zero-to-peak readback voltage can be observed in normal magnetic recording operation. However, the feature readback map $\delta V$ may be observed as the difference between the readback maps of two states of the recording medium, where the difference in the states is the orientation of a magnetic cluster.

Figure 3A:
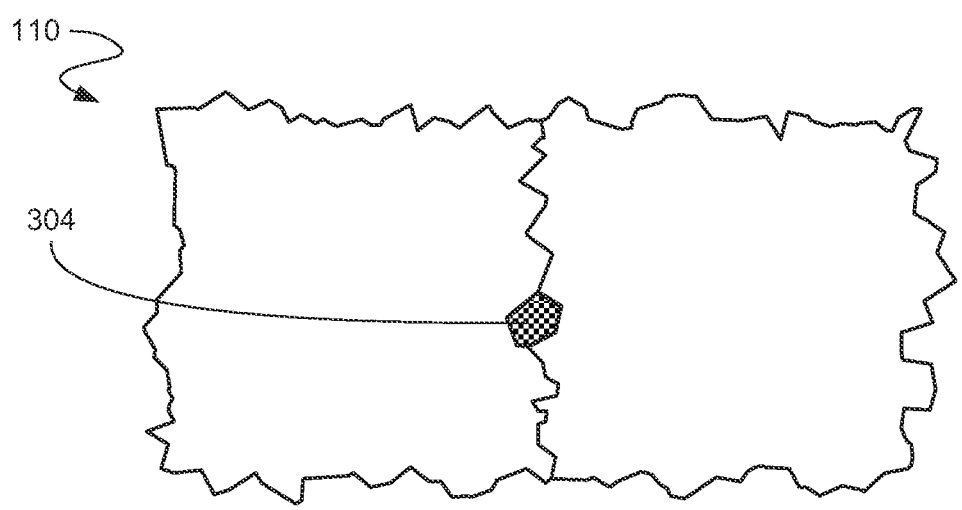
Figure 3B:
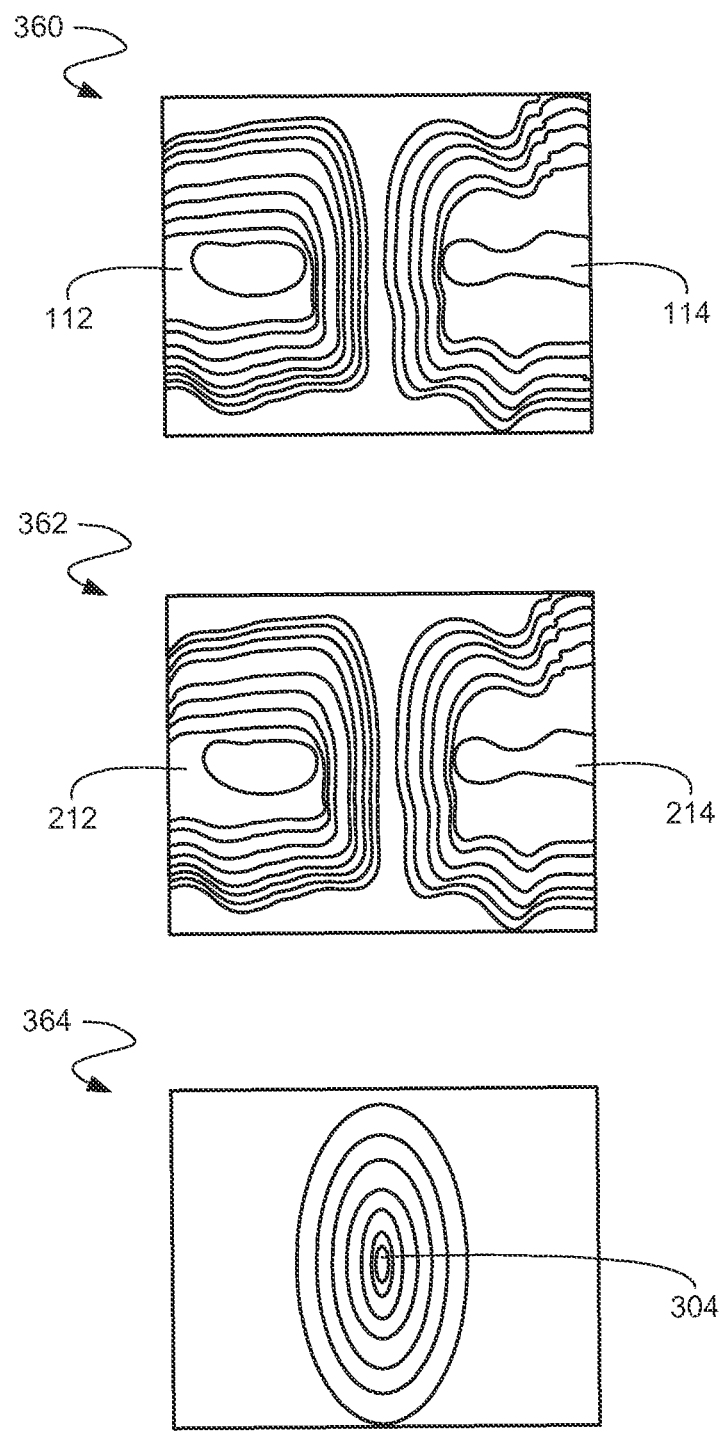
FIG. 3B is a magnified plan view of a portion of the magnetic recording media illustrating the magnetic fields of FIG. 1, FIG. 2, and FIG. 3A, according to an embodiment of the present invention.

FIG. 3B is a magnified plan view of a portion of the magnetic recording media illustrating the magnetic fields of FIG. 1, FIG. 2, and FIG. 3A, according to an embodiment of the present invention. In an embodiment, a device reading the first media map 110 (see FIG. 1) may generate a first magnetic readback map 360. For example, a disk drive may read the first magnetic oriented area 112 and the second magnetic oriented area 114 as the first magnetic readback map 360.

After the second pattern 204 (see FIG. 2) has been written, the device may read the second media map 210 (see FIG. 2) as a second magnetic readback map 362. For example, the disk drive may read the first magnetic oriented area 212 and the second magnetic oriented area 214 as the second magnetic readback map 362. A difference operation, e.g. the above equation, may then be taken between the first magnetic readback map 360 and the second magnetic readback map 362, thus producing a third magnetic readback map 364 corresponding to the transition cluster 304. The third magnetic readback map 364 then is used in the above equation as δV to yield the corresponding area of the transition cluster 304.

Figure 4:
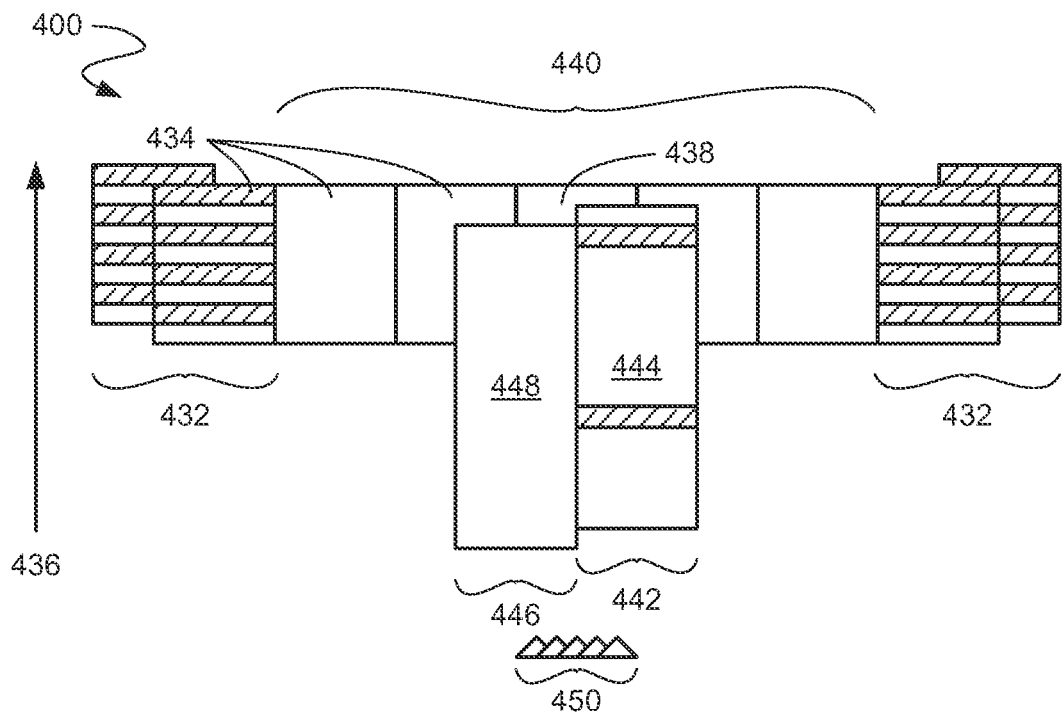
FIG. 4 is a graphical depiction of a method of measuring cluster size, according to another embodiment of the present invention.

FIG. 4 is a graphical depiction 400 of an automated method of measuring cluster size in a crosstrack direction, according to another embodiment of the present invention. In the graphical depiction 400, cluster size is measured by comparing tracks on their sides. Thus, as tracks are written in a downtrack direction, changes along their edges are compared in a crosstrack direction. The changes then indicate cluster size. In an embodiment, the disk drive device (see FIG. 9) may be used to write and read the tracks. However in some embodiments, any device capable of reading and writing the tracks may be used.

In a first step 432, tracks 434 are erased, e.g. AC erased, in a downtrack direction 436 out to +10 and −10 tracks on either side, e.g. crosstrack, of a first track 438. In a second step 440, the tracks 434 are erased, e.g. DC erased, out to +2 and −2 tracks on either side, e.g. crosstrack, of the first track 438. In a third step 442, a first offset track 444 is written at a +0.5 track offset, e.g. crosstrack, from the first track 438. In a fourth step 446, a second offset track 448 is erased, e.g. DC erased, at a −0.5 track offset, e.g. crosstrack, from the first track 438. In a fifth step 450, readbacks are captured many times, e.g. 200 averages, at −0.4, −0.2, 0.0, +0.2, and +0.4 track offsets, e.g. crosstrack, from the first track 438. This first application of step 450 yields the first magnetic readback map. Another application of steps 446 and 450 yields the second magnetic readback map. The difference between these maps yields a third magnetic readback map that consists of well-separated magnetic clusters. The cluster area integral equation above is applied to each instance of magnetic clusters observed in the third map, to yield their corresponding cluster area. In some embodiments the fourth step 446 and the fifth step 450 are repeated many times.

Figure 5A:
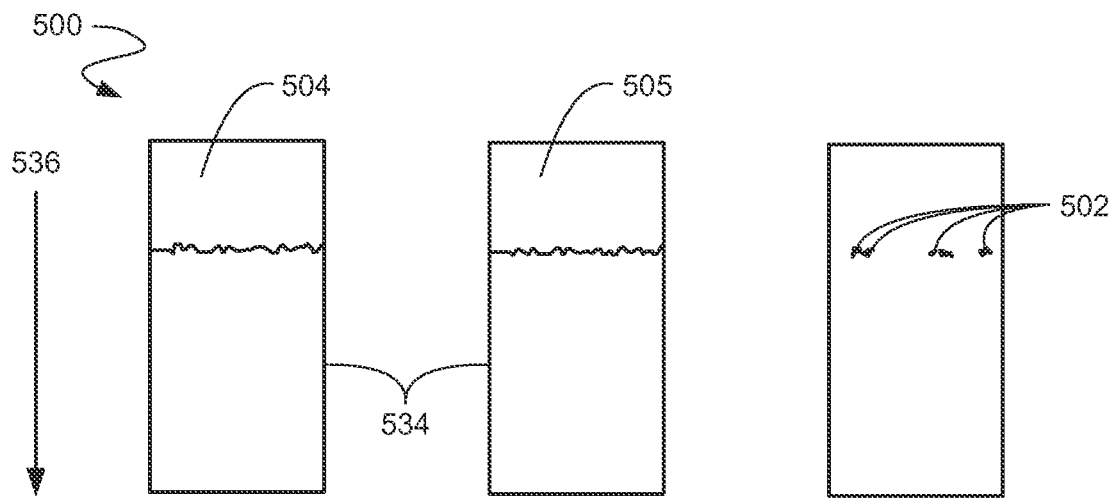
FIG. 5A is a graphical depiction of a method of measuring cluster size, according to another embodiment of the present invention.

FIG. 5A is a graphical depiction 500 of an automated method of measuring cluster size in a downtrack direction, according to another embodiment of the present invention. In the graphical depiction 500, cluster size is measured by writing a first pattern with a head field of, for example, a hard drive. The head field is stepped along the downtrack direction and a second pattern is written. The size of the first pattern and the size of the second pattern are contrasted to determine cluster size along the downtrack direction. In an embodiment, the disk drive device (see FIG. 9) may be used to write and read the patterns. However in some embodiments, any device capable of reading and writing to the patterns may be used.

Figure 9:
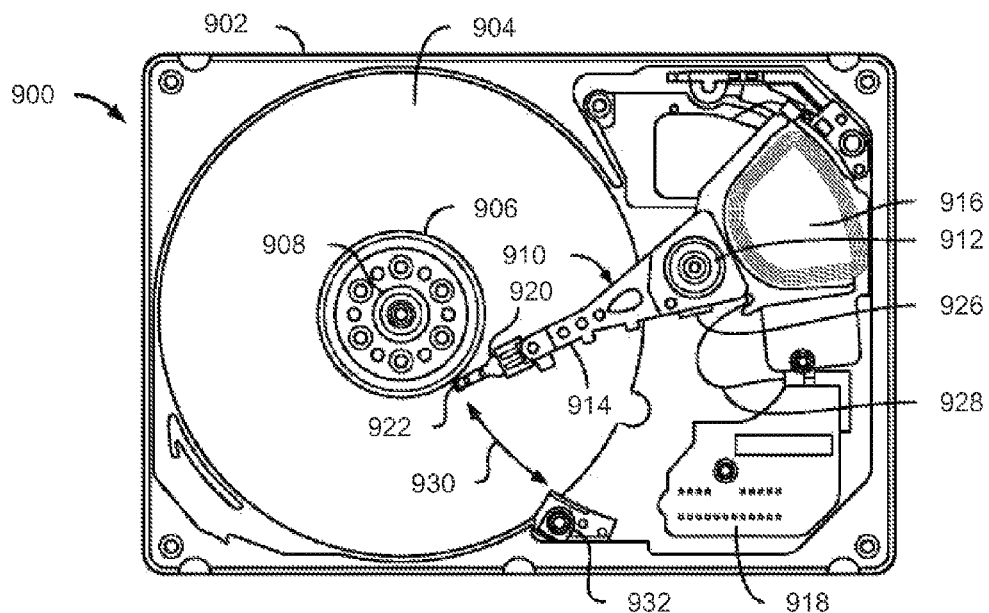
FIG. 9 is a data storage device in which embodiments of the present invention can be implemented to measure cluster size.

A first pattern 504 is written to a track 534 by a magnetic recording device (see FIG. 5B), e.g. a recording head of a disk drive (see FIG. 9). The magnetic recording device (see FIG. 5B) is stepped, e.g. 2 nm, in a downtrack direction 536. A second pattern 505 is written to the track 534 by the magnetic recording device (see FIG. 5B). The size of the first pattern 504 and the size of the second pattern 505 are contrasted, e.g. subtracted, leaving one or more clusters 502.

In some embodiments the magnetic recording device (see FIG. 5B) is repeatedly stepped along in the downtrack direction 536. After each step, pattern sizes are compared, and cluster sizes are recorded. In various embodiments, a distribution of a number of cluster sizes may be recorded and used to, for example, determine average cluster size, numbers of cluster sizes, frequency of cluster sizes, etc. Numbers of cluster sizes may also be used to create a histogram (see FIG. 5C) of cluster sizes on a particular media. Various media with different properties will have differing distributions of cluster sizes, creating unique distribution shapes when graphed on a histogram.

Figure 5B:
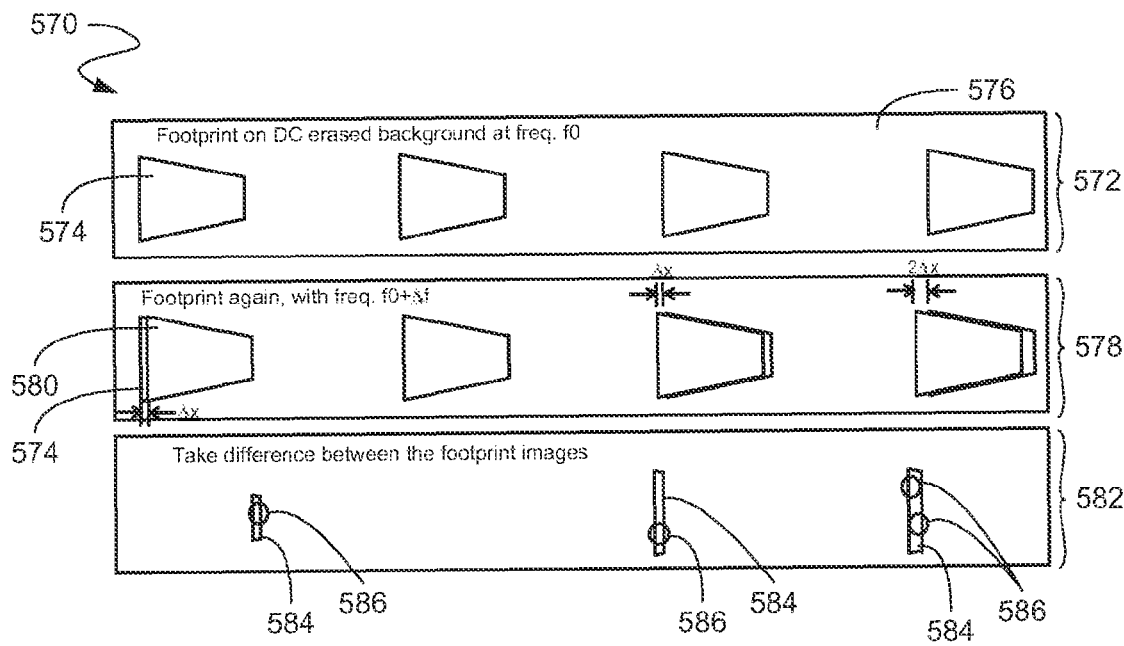
FIG. 5B is another graphical depiction of a method of measuring cluster size, according to another embodiment of the present invention.

FIG. 5B is a plan view 570 of a portion of a magnetic recording device, e.g. recording head, according to another embodiment of the present invention. The plan view 570 illustrates an example of a device, e.g. disk drive, performing the automated method of measuring cluster size in a downtrack direction (see FIG. 5A). In a first step 572, first footprints 574 of a recording device, e.g. disk drive head, are recorded on a DC erased background 576.

In a second step 578, second footprints 580 are recorded at least partially overlying the first footprints 574. For example in an embodiment, second footprints 580 are recorded overlying first footprints at a distance Δx on either side of first footprints 574, at distance 0 overlying first footprints 574, and at distance 2Δx from first footprints 574. In a third step 582, a difference 584 is taken between the footprint images and the size of clusters 586 are calculated.

Figure 5C:
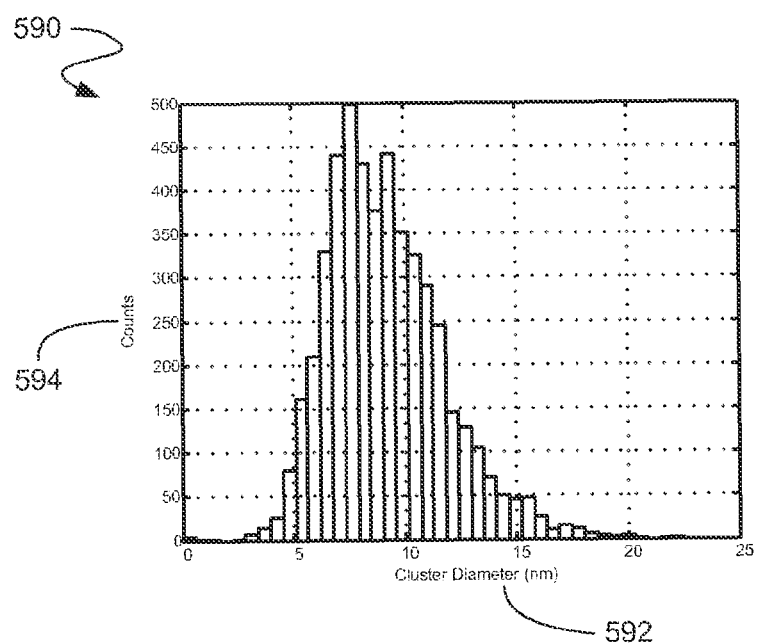
FIG. 5C is a histogram of cluster sizes, according to another embodiment of the present invention.

FIG. 5C is a histogram 590 of cluster sizes, according to an embodiment of the present invention. Cluster sizes may not be uniform. Therefore, a number of cluster sizes may be recorded and analyzed, for example in the histogram 590, as a distribution of cluster diameters. For example, in the histogram 590 cluster diameters 592 may be listed in the x-axis and cluster counts 594 may be listed in the y-axis. Thus, in some embodiments a magnetic recording media may be processed many times to produce a number of cluster measurements. As a result, the histogram 590 of cluster diameters 592 illustrates a more accurate representation of the magnetic recording media.

Figure 6:
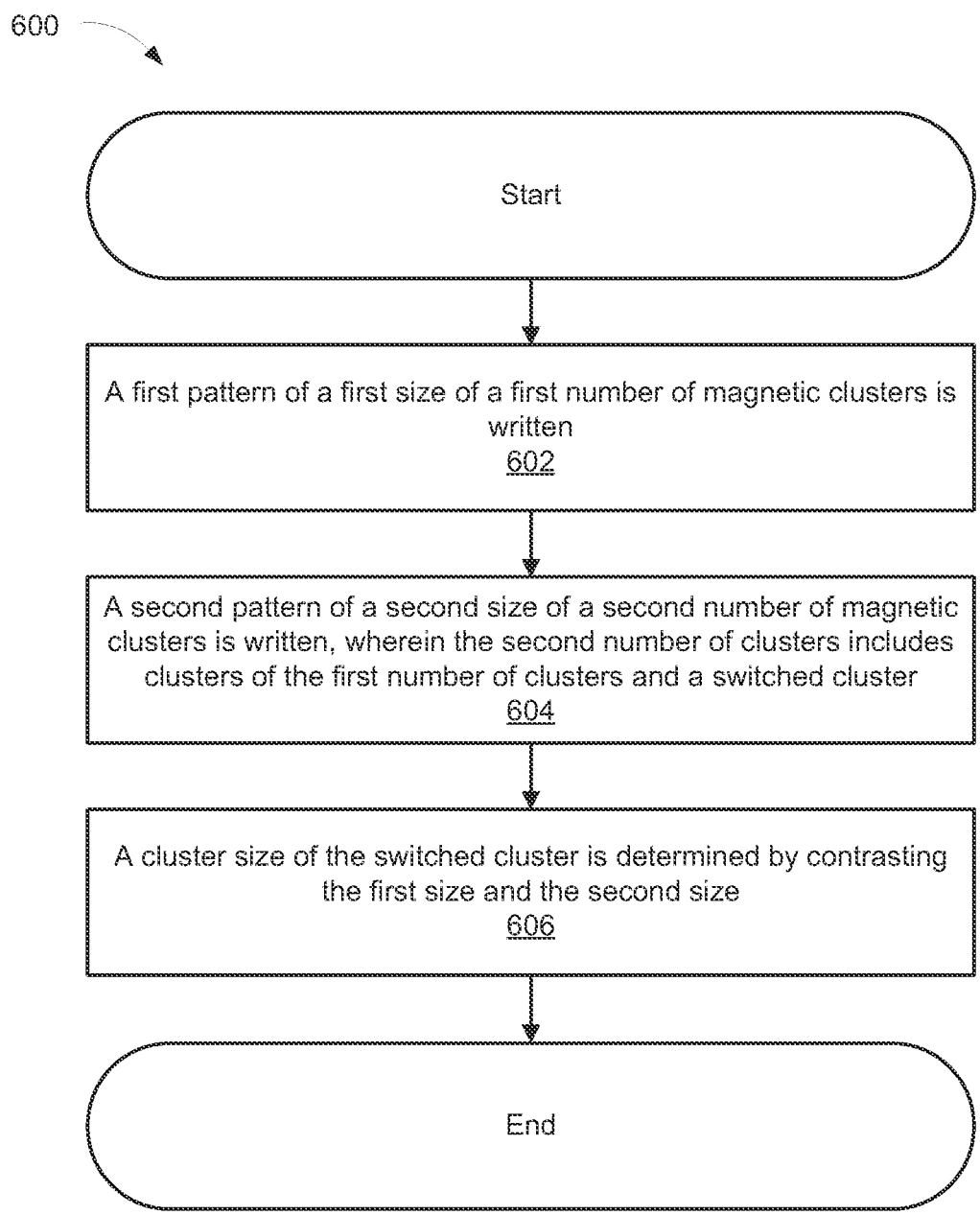
FIG. 6 depicts a flowchart of a process of automatically determining cluster size, according to an embodiment of the present invention.

FIG. 6 depicts a flowchart 600 of an automated process of determining cluster size, according to an embodiment of the present invention. In block 602, a first pattern is written of a first size of a first number of magnetic clusters. For example, in FIG. 1 the first pattern is written to the magnetic recording media. The first pattern includes clusters with a first orientation and clusters with a second orientation.

In block 604, a second pattern is written of a second size of a second number of magnetic clusters. In some embodiments, the second number of clusters includes clusters of the first number of clusters and a switched cluster. For example, in FIG. 2 the second pattern is written to the magnetic recording media. The second pattern is written over the first pattern and includes the clusters from the first pattern. Most of the clusters maintain the first orientation and the second orientation. However, one of the clusters, a switched cluster (see FIG. 3), has switched orientation from the second orientation to the first orientation. Therefore, the size and shape of the first pattern and the second pattern changes.

In block 606, a cluster size of the switched cluster is determined by contrasting the first size and the second size. For example, in FIG. 3 the difference between the first pattern and the second pattern is highlighted as the switched cluster. Thus, the switched cluster is the area of difference between the first pattern and the second pattern.

In an embodiment, the first size is associated with a first cluster map and the second size is associated with a second cluster map. The contrasting includes taking a difference between the first cluster map and the second cluster map. An area under the difference is integrated, and the area is normalized to a peak amplitude to determine a normalized area. The normalized area is determined to be the cluster size. For example, in FIG. 3 the contrasting included determining an area of the switched cluster $A_c$ wherein, $$A_c = \frac{1}{V_0} \int\int \delta V(x', y') dx' dy',$$

and wherein $V_0$=zero-to-peak readback voltage, $\delta V$=two-dimensional cluster readback map, x'=down-track coordinate (direction), y'=cross-track coordinate (direction), dx'=down-track variable of integration, and dy'=cross-track variable of integration.

In a further embodiment, the second pattern is substantially similar to the first pattern. For example, in FIG. 1 and FIG. 2 the only difference between the two patterns is the size of the switched cluster. In some embodiments, the first and second patterns are magnetic patterns. For example, in FIG. 11 a magnetic write head writes magnetic information to a magnetic recording medium. In various embodiments, the cluster size is a minimum size to which information can be written. For example, in FIG. 1 magnetic grains have grouped together to form clusters. As a cluster, the magnetic grains have the same magnetic alignment and switch alignments together in response to external magnetic fields, e.g. a write head.

Figure 7:
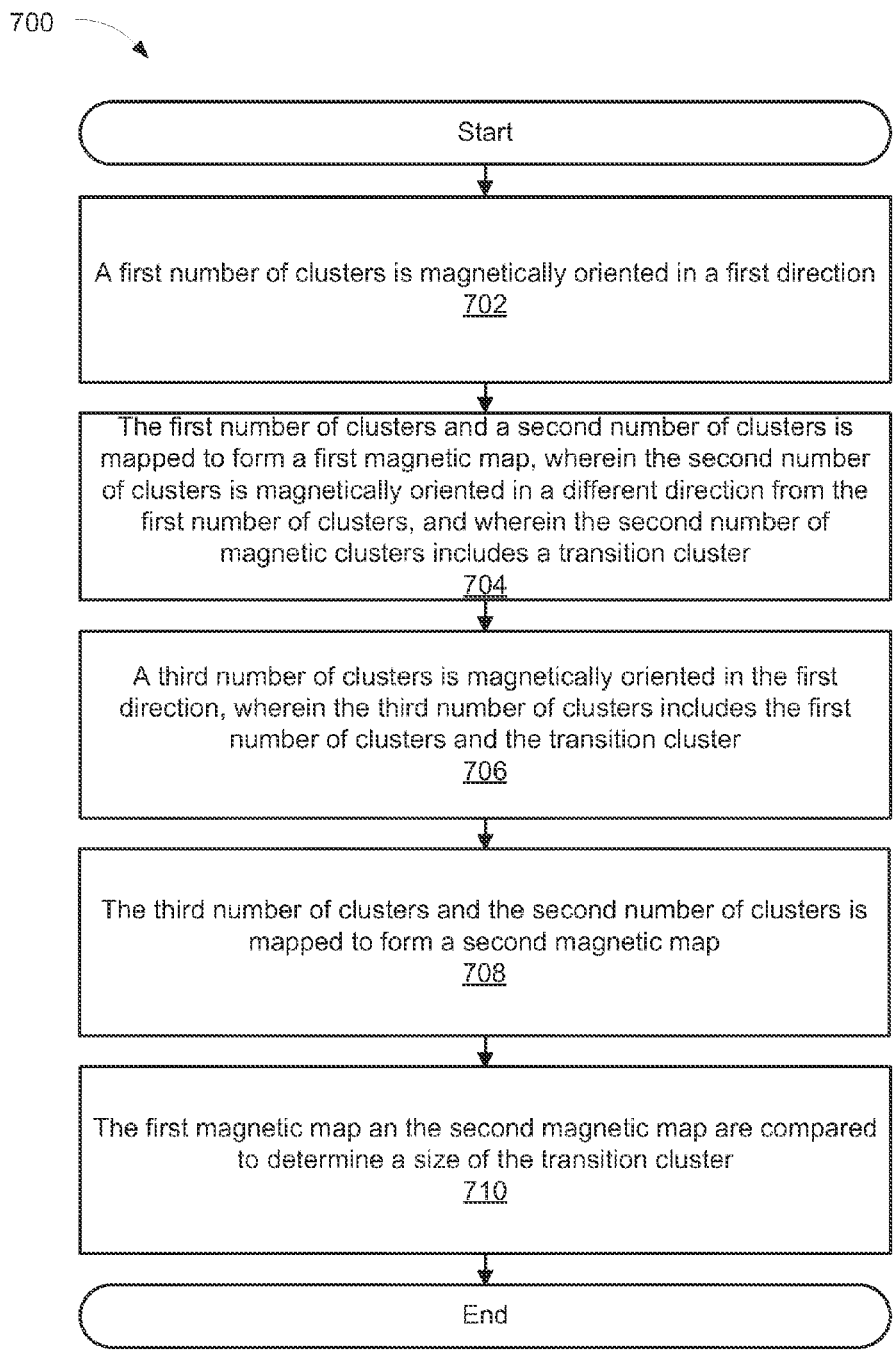
FIG. 7 depicts a flowchart of a process of automatically calculating cluster size according to some embodiments of the present invention.

FIG. 7 depicts a flowchart 700 of an automated process of calculating cluster size according to some embodiments of the present invention. In a block 702, a first number of clusters is magnetically oriented in a first direction. For example, in FIG. 1 first clusters with a first magnetic orientation are written to the magnetic recording media.

In a block 704, the first number of clusters and a second number of clusters are mapped to form a first magnetic map. In some embodiments, the second number of clusters is magnetically oriented in a different direction from the first number of clusters, and the second number of magnetic clusters includes a transition cluster. For example, in FIG. 1 second clusters with a second magnetic orientation on the magnetic recording media are oriented in a different direction from the first clusters with the first magnetic orientation. The first clusters and the second clusters form the first magnetic map of the magnetic recording media.

In a block 706, a third number of clusters is magnetically oriented in the first direction. In some embodiments, the third number of clusters includes the first number of clusters and the transition cluster. For example, in FIG. 2 the second pattern is written to the magnetic recording media. Most of the clusters maintain the first orientation and the second orientation. However, one of the clusters, a switched cluster (see FIG. 3), has switched orientation from the second orientation to the first orientation.

In a block 708, the third number of clusters and the second number of clusters is mapped to form a second magnetic map. For example, in FIG. 2 the second pattern forms a second magnetic map of clusters oriented in the first magnetic direction and the second magnetic direction.

In a block 710, the first magnetic map and the second magnetic map are compared to determine a size of the transition cluster. For example, in FIG. 3 the difference between the first pattern and the second pattern is highlighted as the switched cluster. Thus, the switched cluster is the area of difference between the first pattern and the second pattern.

In an embodiment, the comparing includes taking a difference between the first magnetic map and the second magnetic map. An area under the difference is integrated, and the area is normalized to a peak amplitude to determine a normalized area. The normalized area is determined to be the size of the transition cluster. For example, in FIG. 3 the determining included determining an area of the transition cluster $A_c$ wherein, $$A_c = \frac{1}{V_0} \int\int \delta V(x', y') dx' dy'$$

and wherein $V_0$=zero-to-peak readback voltage, $\delta V$=two-dimensional cluster readback map, x'=down-track coordinate (direction), y'=cross-track coordinate (direction), dx'=down-track variable of integration, and dy'=cross-track variable of integration.

In some embodiments, magnetically orienting the first number of clusters in a first direction includes magnetically orienting a first number of clusters in a first direction on a magnetic recording media. For example, in FIG. 1 the clusters are written to a portion of a magnetic recording media, e.g. a perpendicular magnetic recording medium (see FIG. 10).

In various embodiments, the transition cluster is located at a cross track boundary between the second number of clusters and the third number of clusters. For example, in FIG. 4 tracks are written in a downtrack direction, and changes along their edges are compared in a cross track direction. The changes indicate the size of one or more transition clusters along the cross track boundary.

In an embodiment, each cluster within the first number of clusters, the second number of clusters, and the third number of clusters is a minimum size to which information can be magnetically written. For example, in FIG. 1 magnetic grains have grouped together to form clusters. As a cluster, the magnetic grains have the same magnetic alignment and switch alignments together in response to external magnetic fields, e.g. a write head.

Methods and media structures are described herein, which embodiments of the present invention as described above, may measure cluster size. It is appreciated that magnetic recording media as discussed herein may be utilized with a variety of systems including disc drive memory systems, etc.

Figure 8:
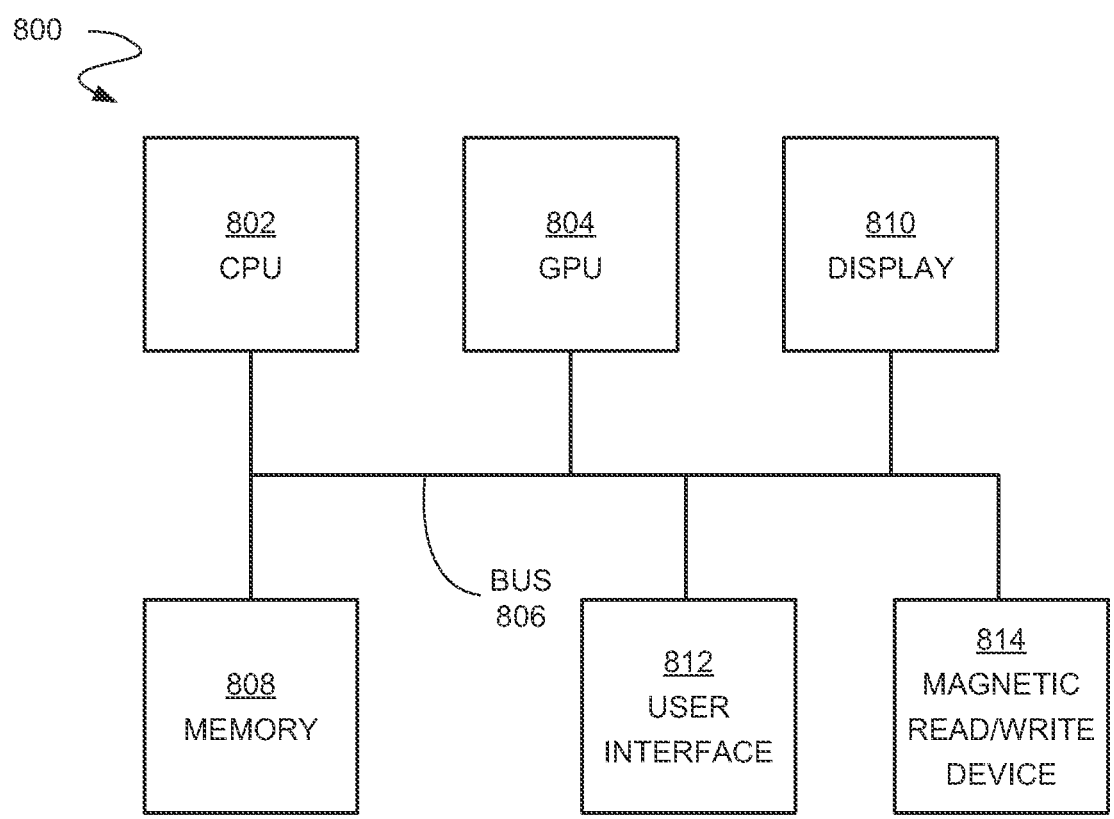
FIG. 8 is a block diagram of an example of a general purpose computer system within which a cluster size measurement system in accordance with the present invention can be implemented.

FIG. 8 is a block diagram of an example of a general purpose computer system 800 within which a cluster measurement system in accordance with the present invention can be implemented. In the example of FIG. 8, the system includes a host central processing unit (CPU) 802 coupled to a graphics processing unit (GPU) 804 via a bus 806. One or more CPUs as well as one or more GPUs may be used.

Both the CPU 802 and the GPU 804 are coupled to memory 808. In the example of FIG. 8, the memory 808 may be a shared memory, whereby the memory stores instructions and data for both the CPU 802 and the GPU 804. Alternatively, there may be separate memories dedicated to the CPU 802 and GPU 804, respectively.

In an embodiment, the memory 808 includes instructions for the cluster measurement system in accordance with the present invention. The instructions control a coupled magnetic read/write device 814. In an embodiment, the coupled magnetic read/write device 814 may be a hard disk drive.

The system 800 also includes a user interface 812 that, in one implementation, includes an on-screen cursor control device, displayed on a coupled display 810. The user interface may include a keyboard, a mouse, a joystick, game controller, and/or a touch screen device (a touchpad).

Generally speaking, the system 800 includes the basic components of a computer system platform that implements functionality in accordance with embodiments of the present invention. The system 800 can be implemented as, for example, any of a number of different types of computer systems (e.g., servers, laptops, desktops, and notebooks).

Magnetic storage media are widely used in various applications, particularly in the computer industry for data storage and retrieval applications, as well as for storage of audio and video signals. Perpendicular magnetic recording media, for example hard disc drive storage devices, include recording media with a perpendicular anisotropy in the magnetic layer. In perpendicular magnetic recording media, residual magnetization is formed in a direction perpendicular to the surface of the magnetic medium, typically by a layer of a magnetic material on a substrate.

A perpendicular recording disc drive head typically includes a trailing write pole, and a leading return or opposing pole magnetically coupled to the write pole. In addition, an electrically conductive magnetizing coil surrounds the yoke of the write pole. During operation, the recording head flies above the magnetic recording medium by a distance referred to as the fly height. To write to the magnetic recording medium, the magnetic recording medium is moved past the recording head so that the recording head follows the tracks of the magnetic recording medium, with the magnetic recording medium first passing under the return pole and then passing under the write pole. Current is passed through the coil to create magnetic flux within the write pole. The magnetic flux passes from the write pole tip, through the hard magnetic recording track, into the soft underlayer, and across to the return pole. In addition to providing a return path for the magnetic flux, the soft underlayer produces magnetic charge images of the magnetic recording layer, increasing the magnetic flux and increasing the playback signal. The current can be reversed, thereby reversing the magnetic field and reorienting the magnetic dipoles.

The perpendicular recording medium is a continuous layer of discrete, contiguous magnetic crystals or domains. Within the continuous magnetic layer, discrete information is stored in individual bits. The individual bits are magnetically oriented positively or negatively, to store binary information. Areal density is a function of the number of the individual bits on the recording medium. As areal densities increase, the amount of information stored on the recording medium also increases. Manufacturers strive to satisfy the ever-increasing consumer demand for higher capacity hard drives by increasing the areal density.

High density perpendicular recording media use carefully balanced magnetic properties. These carefully balanced magnetic properties include sufficiently high anisotropy (perpendicular magnetic orientation) to ensure thermal stability, resist erasure, and function effectively with modern disc drive head designs; and grain-to-grain uniformity of magnetic properties sufficient to maintain thermal stability and to minimize the switching field distribution (SFD).

As recording densities increase, smaller grain structures help to maintain the number of magnetic particles in a bit at a similar value. But smaller grain structures are easier to erase, requiring higher anisotropy to maintain thermal stability, and making writability worse. Further, when individual storage bits within magnetic layers of magnetic recording media are reduced in size, they store less energy making it easier for the bits to lose information. Also, as individual weaker bits are placed closer together, it is easier for continuous read/write processes and operating environments to create interference within and between the bits. This interference disrupts the read/write operations, resulting in data loss.

The magnetic layers may be designed as an ordered array of uniform islands, each island storing an individual bit. This is referred to as bit patterned media. By eliminating the continuous magnetic layer and restricting the bits to discrete magnetic islands, interference is reduced and areal densities are increased. However, high areal density bit patterned media (e.g., >500 Gbpsi) demands high anisotropy of the magnetic material in the islands.

FIG. 9 is a data storage device in which embodiments of the present invention can be implemented to measure cluster size. In addition, embodiments of the present invention can be implemented in a number of devices including, for example, spin-stands and non-drive test systems.

FIG. 9 is a plan view of a disc drive 900. The disc drive 900 generally includes a base plate 902 and a cover (not shown) that may be disposed on the base plate 902 to define an enclosed housing for various disc drive components. The disc drive 900 includes one or more data storage discs 904 of computer-readable data storage media. Typically, both of the major surfaces of each data storage disc 904 include a plurality of concentrically disposed tracks for data storage purposes. Each data storage disc 904 is mounted on a hub or spindle 906, which in turn is rotatably interconnected with the base plate 902 and/or cover. Multiple data storage discs 904 are typically mounted in vertically spaced and parallel relation on the spindle 906. A spindle motor 908 rotates the data storage discs 904 at an appropriate rate.

The disc drive 900 also includes an actuator arm assembly 910 that pivots about a pivot bearing 912, which in turn is rotatably supported by the base plate 902 and/or cover. The actuator arm assembly 910 includes one or more individual rigid actuator arms 914 that extend out from near the pivot bearing 912. Multiple actuator arms 914 are typically disposed in vertically spaced relation, with one actuator arm 914 being provided for each major data storage surface of each data storage disc 904 of the disc drive 900. Other types of actuator arm assembly configurations could be utilized as well, such as an "E" block having one or more rigid actuator arm tips or the like that cantilever from a common structure. Movement of the actuator arm assembly 910 is provided by an actuator arm drive assembly, such as a voice coil motor 916 or the like. The voice coil motor 916 is a magnetic assembly that controls the operation of the actuator arm assembly 910 under the direction of control electronics 918.

A load beam or suspension 920 is attached to the free end of each actuator arm 914 and cantilevers therefrom. Typically, the suspension 920 is biased generally toward its corresponding data storage disc 904 by a spring-like force. A slider 922 is disposed at or near the free end of each suspension 920. What is commonly referred to as the read/write head (e.g., transducer) is appropriately mounted as a head unit (not shown) under the slider 922 and is used in disc drive read/write operations. The head unit under the slider 922 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 922 is connected to a preamplifier 926, which is interconnected with the control electronics 918 of the disc drive 900 by a flex cable 928 that is typically mounted on the actuator arm assembly 910. Signals are exchanged between the head unit and its corresponding data storage disc 904 for disc drive read/write operations. In this regard, the voice coil motor 916 is utilized to pivot the actuator arm assembly 910 to simultaneously move the slider 922 along a path 930 and across the corresponding data storage disc 904 to position the head unit at the appropriate position on the data storage disc 904 for disc drive read/write operations.

When the disc drive 900 is not in operation, the actuator arm assembly 910 is pivoted to a "parked position" to dispose each slider 922 generally at or beyond a perimeter of its corresponding data storage disc 904, but in any case in vertically spaced relation to its corresponding data storage disc 904. In this regard, the disc drive 900 includes a ramp assembly 932 that is disposed beyond a perimeter of the data storage disc 904 to both move the corresponding slider 922 vertically away from its corresponding data storage disc 904 and to also exert somewhat of a retaining force on the actuator arm assembly 910.

Figure 10:
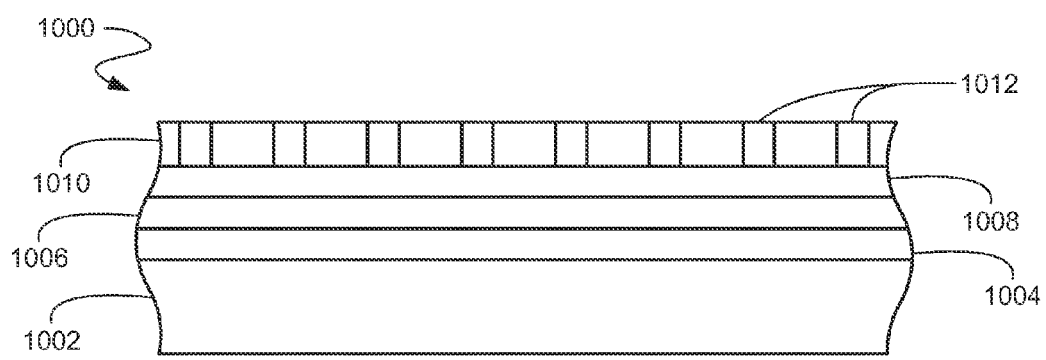
FIG. 10 is a simplified cross-sectional view of a perpendicular magnetic recording medium, which may be used in the data storage device.

FIG. 10 is a simplified cross-sectional view of a perpendicular magnetic recording medium 1000, which may be used for the data storage disc 904 (FIG. 9). The perpendicular magnetic recording medium 1000 is an apparatus including multiple layers established upon a substrate 1002. A seed layer 1008 is a layer that is established overlying the substrate. A base layer 1010 is a layer that is established overlying the seed layer 1008. Perpendicular magnetic recording islands 1012 are recording areas that may be established in the base layer 1010 and on the seed layer 1008.

The substrate 1002 can be fabricated from materials known to those skilled in the art to be useful for magnetic recording media for hard disc storage devices. For example, the substrate 1002 may be fabricated from aluminum (Al) coated with a layer of nickel phosphorous (NiP). However, it will be appreciated that the substrate 1002 can also be fabricated from other materials such as glass and glass-containing materials, including glass-ceramics. The substrate 1002 may have a smooth surface upon which the remaining layers can be deposited.

In a further embodiment, a buffer layer 1004 is established overlying the substrate 1002, a soft underlayer 1006 is established overlying the buffer layer 1004, and the seed layer 1008 is overlying the soft underlayer 1006. The buffer layer 1004 can be established from elements such as Tantalum (Ta). The soft underlayer 1006 can be established from soft magnetic materials such as CoZrNb, CoZrTa, FeCoB and FeTaC. The soft underlayer 1006 can be formed with a high permeability and a low coercivity. For example, in an embodiment the soft underlayer 1006 has a coercivity of not greater than about 10 oersteds (Oe) and a magnetic permeability of at least about 50. The soft underlayer 1006 may comprise a single soft underlayer or multiple soft underlayers, and may be separated by spacers. If multiple soft underlayers are present, the soft underlayers can be fabricated from the same soft magnetic material or from different soft magnetic materials.

In the embodiment illustrated, the seed layer 1008 is disposed on the soft underlayer 1006. The seed layer 1008 can be established, for example, by physical vapor deposition (PVD) or chemical vapor deposition (CVD) from noble metal materials such as, for example, Ru, Ir, Pd, Pt, Os, Rh, Au, Ag or other alloys. The use of these materials results in desired growth properties of the perpendicular magnetic recording islands 1012.

The perpendicular magnetic recording islands 1012 as described herein may be formed within the base layer 1010 and on the seed layer 1008. The perpendicular magnetic recording islands 1012 can be established to have an easy magnetization axis (e.g., the C-axis) that is oriented perpendicular to the surface of the perpendicular magnetic recording medium 1000. Useful materials for the perpendicular magnetic recording islands 1012 include cobalt-based alloys with a hexagonal close packed (hcp) structure. Cobalt can be alloyed with elements such as chromium (Cr), platinum (Pt), boron (B), niobium (Nb), tungsten (W) and tantalum (Ta).

The perpendicular magnetic recording medium 1000 can also include a protective layer (not shown) on top of the perpendicular magnetic recording islands 1012 and/or the base layer 1010, such as a protective carbon layer, and a lubricant layer disposed over the protective layer. These layers are adapted to reduce damage from the read/write head interactions with the recording medium during start/stop operations.

Figure 11:
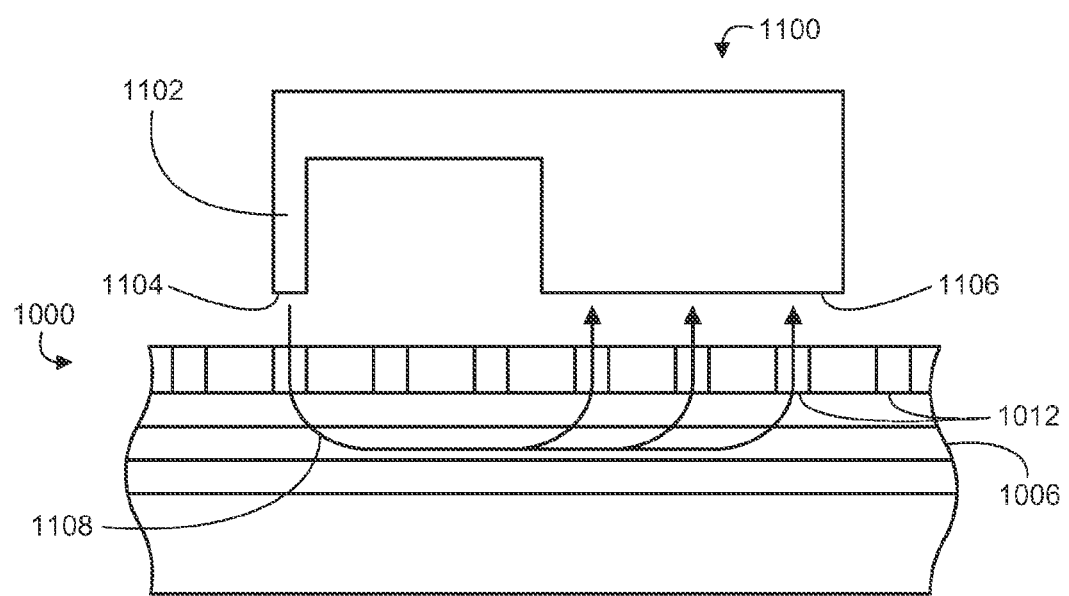
FIG. 11 is a simplified cross-sectional view of a portion of the perpendicular magnetic recording medium with a head unit.

FIG. 11 is a simplified cross-sectional view of a portion of the perpendicular magnetic recording medium 1000 with a head unit 1100. During the writing process, a perpendicular write head 1102 flies or floats above the perpendicular magnetic recording medium 1000. The perpendicular write head 1102 includes a write pole 1104 coupled to an auxiliary pole 1106. The arrows shown indicate the path of a magnetic flux 1108, which emanates from the write pole 1104 of the perpendicular write head 1102, entering and passing through at least one perpendicular magnetic recording island 1012 in the region below the write pole 1104, and entering and traveling within the soft underlayer 1006 for a distance. The magnetically soft underlayer 1006 serves to guide magnetic flux emanating from the head unit 1100 through the recording island 1012, and enhances writability. As the magnetic flux 1108 travels towards and returns to the auxiliary pole 1106, the magnetic flux 1108 disperses.

The magnetic flux 1108 is concentrated at the write pole 1104, and causes the perpendicular magnetic recording island 1012 under the write pole 1104 to magnetically align according to the input from the write pole 1104. As the magnetic flux 1108 returns to the auxiliary pole 1106 and disperses, the magnetic flux 1108 may again encounter one or more perpendicular magnetic recording islands 1012. However, the magnetic flux 1108 is no longer concentrated and passes through the perpendicular magnetic recording islands 1012, without detrimentally affecting the magnetic alignment of the perpendicular magnetic recording islands 1012.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method comprising:
    orienting a first plurality of magnetic clusters of a magnetic recording media;
    orienting a second plurality of magnetic clusters of the magnetic recording media; and
    calculating a cluster size by contrasting the first plurality of magnetic clusters of the magnetic recording media and the second plurality of magnetic clusters of the magnetic recording media, wherein the calculating is based on a reading from a device configured for reading the magnetic recording media.

2. The method of claim 1 wherein the calculating comprises:
    determining a difference between the first plurality of magnetic clusters and the second plurality of magnetic clusters;
    integrating an area under the difference; and
    normalizing the area to a peak amplitude to determine a normalized area, wherein the normalized area is determined to be the cluster size.

3. The method of claim 1 wherein the calculating comprises determining an area of a cluster (Ac) wherein, $$A_c = \frac{1}{V_0} \int\int dx'dy' \delta V(x', y'),$$

and wherein $V_0$=zero-to-peak readback voltage, $\delta V$=two-dimensional cluster readback map, x'=down-track coordinate (direction), y'=cross-track coordinate (direction), dx'=down-track variable of integration, and dy'=cross-track variable of integration.

4. The method of claim 1 wherein the first plurality of magnetic clusters and the second plurality of magnetic clusters are oriented in magnetically different orientations.

5. The method of claim 1, wherein
the second plurality of magnetic clusters includes clusters of the first plurality of magnetic clusters and a switched cluster; and
calculating comprises calculating the cluster size of the switched cluster.

6. The method of claim 1 wherein the cluster size is a minimum size to which a bit of recorded information can be stored.

7. The method of claim 1 further comprising:
orienting a third plurality of magnetic clusters;
calculating a second cluster size by contrasting the second plurality of magnetic clusters and the third plurality of magnetic clusters; and
recording a distribution of a plurality of cluster sizes, wherein the distribution includes the cluster size and the second cluster size.

8. A non-transitory computer readable medium having stored thereon, computer executable instructions, that, if executed by a processor causes the processor to perform a method comprising:
orienting a first plurality of magnetic clusters;
orienting a second plurality of magnetic clusters; and
calculating a cluster size of a switched cluster, wherein the switched cluster is associated with a change in orientation.

9. The non-transitory computer readable medium of claim 8:
wherein the first plurality of magnetic clusters is associated with a first cluster map and the second plurality of magnetic clusters is associated with a second cluster map, and
wherein calculating comprises:
determining a difference between the first cluster map and the second cluster map;
integrating an area under the difference; and
normalizing the area to a peak amplitude to determine a normalized area, wherein the normalized area is determined to be the cluster size.

10. The non-transitory computer readable medium of claim 8 wherein calculating comprises measuring an area of the switched cluster (Ac) wherein, $$A_c = \frac{1}{V_0} \int\int dx' dy' \delta V(x', y'),$$

and wherein $V_0$=zero-to-peak readback voltage, $\delta V$=two-dimensional cluster readback map, x'=down-track coordinate (direction), y'=cross-track coordinate (direction), dx'=down-track variable of integration, and dy'=cross-track variable of integration.

11. The non-transitory computer readable medium of claim 8 wherein the first plurality of magnetic clusters and the second plurality of magnetic clusters are oriented in magnetically different orientations.

12. The non-transitory computer readable medium of claim 8, wherein the first plurality of magnetic clusters is of a first pattern of a first size,
the second plurality of magnetic clusters is of a second pattern of a second size, and
calculating the cluster size includes contrasting the first size and the second size.

13. The non-transitory computer readable medium of claim 8 wherein the cluster size is a minimum size to which a bit of recorded information can be stored.

14. The non-transitory computer readable medium of claim 8, wherein the method further comprises:
orienting a third plurality of magnetic clusters, wherein the third plurality of magnetic clusters includes clusters of the second plurality of magnetic clusters and a second switched cluster;
calculating a second cluster size of the second switched cluster; and
recording a distribution of a plurality of cluster sizes, wherein the distribution includes the cluster size and the second cluster size.

15. A method comprising:
writing a first pattern of a first size of a first plurality of magnetic clusters;
writing a second pattern of a second size of a second plurality of magnetic clusters, wherein the second plurality of clusters includes clusters of the first plurality of clusters and a switched cluster; and
determining a cluster size of the switched cluster by comparing the first size and the second size.

16. The method of claim 15:
wherein the first size is associated with a first cluster map and the second size is associated with a second cluster map, and
wherein determining comprises:
taking a difference between the first cluster map and the second cluster map;
integrating an area under the difference; and
normalizing the area to a peak amplitude to determine a normalized area, wherein the normalized area is determined to be the cluster size.

17. The method of claim 15 wherein determining further comprises determining an area of the switched cluster (Ac) wherein, $$A_c = \frac{1}{V_0} \int\int dx' dy' \delta V(x', y'),$$

and wherein $V_0$=zero-to-peak readback voltage, $\delta V$=two-dimensional cluster readback map, x'=down-track coordinate (direction), y'=cross-track coordinate (direction), dx'=down-track variable of integration, and dy'=cross-track variable of integration.

18. The method of claim 15 further comprising repeating writing the first pattern, writing the second pattern, and determining cluster size n times, and compiling a cluster size distribution.

19. The method of claim 15 wherein the cluster size is a minimum size to which a bit of recorded information can be stored.

20. The method of claim 15 further comprising:
writing a third pattern of a third size of a third plurality of magnetic clusters, wherein the third plurality of magnetic clusters includes clusters of the second plurality of magnetic clusters and a second switched cluster;

determining a second cluster size of the second switched cluster; and recording a distribution of a plurality of cluster sizes, wherein the distribution includes the cluster size and the second cluster size.

* * * * *